United States Patent [19]

Wojnarowski et al.

[11] Patent Number: 4,646,149

[45] Date of Patent: Feb. 24, 1987

[54] ALTERNATE FIELD LUMINANCE ENHANCEMENT IN A SPECTRUM CONSERVING TELEVISION SYSTEM

[75] Inventors: Robert J. Wojnarowski, Ballston Lake; Charles W. Eichelberger, Schenectady, both of N.Y.

[73] Assignee: General Electric Company, Schenectady, N.Y.

[21] Appl. No.: 697,560

[22] Filed: Feb. 1, 1985

[51] Int. Cl.[4] .......................... H04N 7/04; H04N 11/06
[52] U.S. Cl. ...................................... 358/143; 358/142; 358/12; 358/133
[58] Field of Search ................. 358/12, 142, 143, 145, 358/146, 147, 133

[56] References Cited

U.S. PATENT DOCUMENTS

4,467,356  8/1984  McCoy .................................. 358/12

Primary Examiner—Michael A. Masinick
Assistant Examiner—Robert M. Bauer
Attorney, Agent, or Firm—Marvin Snyder; James C. Davis, Jr.

[57] ABSTRACT

An improved television bandwidth compression system allows two television programs to simultaneously utilize the bandwidth normally allowed for one television program. The basic bandwidth compression system comprises a transmitter which receives composite video signals from two program sources. The video processing circuitry of the transmitter provides an output signal wherein time-compressed chrominance information for the two program sources is sent on alternate lines during the normal horizontal retrace time and the luminance information for both program sources is sent during the active video time for each line. The receiver synthesizes a composite video signal of a selected program from the output signal transmitted from the transmitter. This basic system is improved by interlacing high and low bandwidth-limited luminance signals for alternating fields of each program in a manner such that when a high bandwidth-limited luminance signal is transmitted for one program, a low bandwidth-limited luminance signal is transmitted for the other program so that the total bandwidth allocated for the luminance signals is not exceeded.

11 Claims, 7 Drawing Figures

ALTERNATE FIELD LUMINANCE ENHANCEMENT IN A SPECTRUM CONSERVING TELEVISION SYSTEM

CROSS-REFERENCE TO RELATED APPLICATIONS

This application discloses subject matter which is related to the subject matter disclosed in the following copending and commonly assigned applications and commonly assigned U.S. Patents:

U.S. Pat. No. 4,533,960 issued to Cutler and Welles for "System for Encoding and Decoding Video Signals".

U.S. Pat. No. 4,533,936 issued to Tiemann Engeler for "System for Encoding and Decoding Video Signals".

Ser. No. 06/697,535 filed concurrently herewith by Eichelberger and Wojnarowski for "Chrominance Time-Compressed, Luminance Bandwidth-Reduced Television System".

Ser. No. 06/697,600 filed concurrently herewith by Eichelberger, Wojnarowski and Mihran for "Sharpness Enhanced Equal Bandwidth Luminance Bandwidth Reduction System".

Ser. No. 06/697,601 filed concurrently herewith by Welles, Eichelberger and Wojnarowski for "Television Frame Synchronizer With Independently Controllable Input/Output Rates".

The disclosures of the foregoing copending patent applications are incorporated herein by reference.

BACKGROUND OF THE INVENTION

The present invention generally relates to techniques and apparatus for optimizing the use of frequency spectrum allocated for transmission of information and, more particularly, to a technique and apparatus for limiting to high and low values the luminance bandwidths of alternate fields of a television picture such that signals televised from two different sources to produce two different pictures, respectively, can occupy the same portion of channel spectrum with minimal visible artifacts.

The general problem solved by the invention is to transmit two television programs in the six megahertz channel space normally allotted for one program and allow reception of either program at each of a plurality of locations where the programs are received. This is particularly desirable in cable television systems in which a limited number of channels are available for transmitting television programs to subscribers. Several methods for achieving this improvement in spectrum utilization have been implemented in the prior art; however, each of the prior art methods have resulted in problems of performance and/or cost.

Typically, prior art systems used to process television signals have used a technique of sending one horizontal line at high bandwidth followed by limited bandwidth information which, in combination with the first line, can be used to form the second horizontal line. These techniques invariably generate visible artifacts in vertical lines that show up as alternate wide and narrow portions known as "zippering" or a stair-step pattern on slant lines known as "jaggies".

A different approach is taken in the chrominance time-compressed, luminance bandwidth-reduced television system disclosed in copending patent application Ser. No. 06/697,535. In that system, the chrominance information is transmitted in time-compressed from during the inactive picture time. By "inactive picture time" what is meant is the normal horizontal retrace time plus the time of the nonvisible overscan of a line. In the NTSC composite video signal, for example, this is the time period during which the synchronizing signal is transmitted. In order to provide room for the time-compressed chrominance information, the synchronizing signal is narrowed. The synchronizing signal may precede or follow the timecompressed chrominance information, and the polarity of the synchronizing signal may be reversed to allow an increase in the dynamic range of the composite signal. Chrominance information for a given program is sent once every other line with the other program chrominance information occupying the unused line position. Luminance information for both programs is sent during the active video time for each line. By "active video time" what is meant is that time period of the composite video signal during which a visible image is produced. The way in which luminance information for both programs is sent simultaneously is by modulating one program on the main carrier and modulating the second program on a subcarrier approximately 4.5 MHz removed from the main carrier.

The television system disclosed in copending patent application Ser. No. 06/697,535 would exhibit a deficiency, were it not for the present invention which is employed in that system. Specifically, the luminance bandwidth of a given television program, under the NTSC standards, is limited to 2.25 MHz. This results in a "soft" picture; i.e., one in which the edges of images viewed on the screen are not sharply defined. Although the picture can be enhanced by the use of peaking, as disclosed in copending patent application Ser. No. 06/697,600, this enhancement, by itself, would nevertheless be judged to result in pictures somewhat softer than NTSC standard pictures.

SUMMARY OF THE INVENTION

It is therefore, an object of the subject invention to provide a method and apparatus for permitting two television programs to be transmitted simultaneously using a six megahertz channel, such as is presently designated for transmitting one television program, with no obvious artifacts in the displayed images and thereby achieving little or no perceived degradation from the NTSC standard.

It is another object of this invention to provide a television bandwidth reduction system which requires a minimum of receiver processing during the active picture time such that all processing occurs in real time without time compression.

A further object of the invention is to provide a spectrum-conserving television system which is amenable to peaking and signal enhancement without also enhancing the system artifacts.

Still another object of the invention is to provide a television bandwidth reduction system in which the effects of overlap between the spectra of two television programs transmitted simultaneously within the same bandwidth causes minimum observable effect in the program selected for viewing.

According to the invention, chrominance information for a given program is sent once every other line, with the chrominance information for the second program being sent during the alternate line positions. The chrominance information is sent in a time-compressed form during the normal horizontal retrace time, and reconstructed at the receiving location. The luminance information for both programs is sent during the active video time for each line. This is done by modulating one program on a subcarrier approximately 4.5 MHz removed from the main carrier. This system is described in greater detail in copending patent application Ser. No. 06/697,535. In the instant invention, picture sharpness is significantly improved by sending field one, picture one at high bandwidth while field one, picture two is sent at low bandwidth, then reversing the bandwidths on field two.

The prior art systems for transmitting two different television signals in the same portion of the spectrum normally allocated for one such signal are known as frequency division multiplexing and time division multiplexing. These systems are described in detail in patent applications Ser. No. 06/435,792 and Ser. No. 06/479,584, respectively, referenced above. The present invention is distinguished over the prior art systems represented by these applications in that the luminance information for both channels is sent on a line-by-line basis with no processing except demodulation required during the active video time. This invention also differs from all other known approaches which use high-low interlaced field concepts.

The television system disclosed in copending patent application Ser. No. 06/697,535 uses low pass filters to limit the luminance bandwidth to approximately 2.25 MHz maximum for each picture. The present invention distinguishes over that approach by limiting the luminance to high bandwidths on one field and low bandwidths on the next field.

Field interlacing is well known in the television art. It basically involves the horizontal scanning velocity, the horizontal retrace velocity, and the vertical scanning velocity given to a spot on the picture. The two fields to be interlaced must be set accurately in the intervals between scans to avoid overlapping or line pairing effects appearing on the raster. Active scanning lines of the first field trace a path from top right to lower left down the screen in a "venetian blind" fashion, then a one half line retrace at increased velocity moves the spot to the center top of the raster, and when the spot reaches the top of the frame it has traced out one half of the lines in the frame. Since the number of lines per frame is an odd number (525), one half of the number is a whole number plus one half ($262\frac{1}{2}$). Consequently, at the end of the upward vertical retrace motion, the spot is midway along the top edge of the frame. It is at this instant that the downward horizontal scanning motion recommences. Thereafter, the second field is traced out, completing the picture and interlacing the raster. Since the second field starts from a displaced one half frame width position, it follows that the second field is displaced upward relative to the first field. The active portion of the second field is completed one half way at the bottom of the raster. At this point, the spot becomes inactive and retraces to restart the process for the next frame.

The continuity of the image depends on the rate at which the fields are repeated. The rate must be high enough to basically satisfy an apparent continuous motion and to avoid the appearance of flicker. Brightness and flicker are related by incident and ambient lighting and for a given observer, with viewing conditions fixed, the threshold field repetition rate at which flicker will just become apparent is found to vary with the logarithm of the brightness.

The present invention takes advantage of the fact that the NTSC standard requires interlacing to avoid flicker. This means that there are two essentially complete picture fields whose lines are displaced by one line space. According to the invention, any artifact created by the low bandwidth field is negated by high bandwidth lines on either side.

BRIEF DESCRIPTION OF THE DRAWINGS

The foregoing and other objects, aspects and advantages of the invention will be better understood from the following detailed description, in which.

DETAILED DESCRIPTION OF THE INVENTION

Figure 1A:
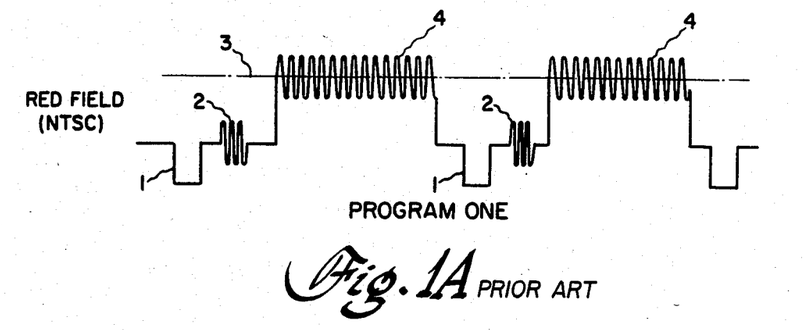
FIGS. 1A, 1B and 1C are drawings of waveforms showing two signals formatted in the NTSC format and a video signal formatted according to the chrominance time-compressed, luminance bandwidth-reduced television system described and claimed in copending patent application Ser. No. 06/697,535.
Figure 1B:
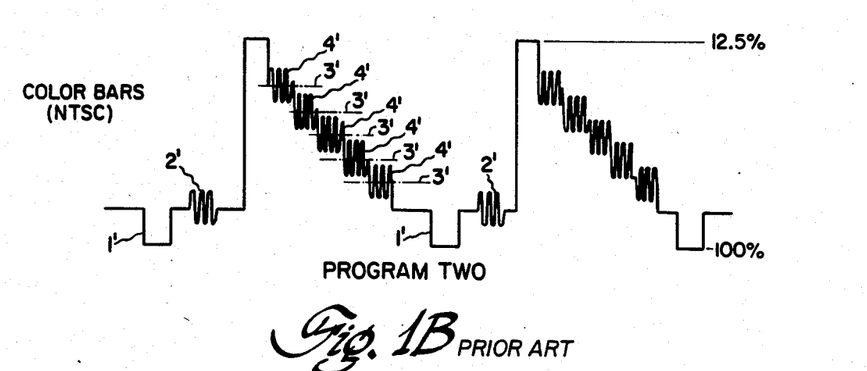
Figure 1C:
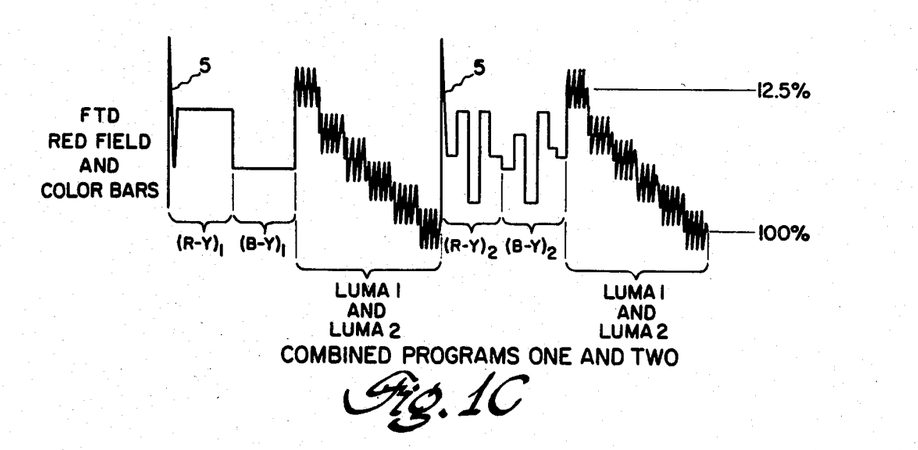

The present invention is preferably practiced in the chrominance time-compressed, luminance bandwidth-reduced television system disclosed in copending patent application Ser. No. 06/697,535 filed by Eichelberger and Wojnarowski. Before describing the present invention, there is first presented a brief description of the aforementioned chrominance time-compressed, luminance bandwidth-reduced television system. Referring now to the drawings, and more particularly to FIGS. 1A, 1B and 1C, there are shown two video signals in the NTSC format and a composite video signal as generated according to the chrominance time-compressed, luminance bandwidth-reduced television system. A video signal as represented in FIG. 1A may be utilized by a television receiver to generate a flat red field, and a video signal as represented in FIG. 1B may be utilized by a television receiver to generate color bars. As shown in FIG. 1A, a horizontal line of program one consists of a sync pulse 1 and a color burst 2, followed by a luminance level 3 with the chrominance subcarrier information 4 riding thereon. As shown in FIG. 1B, program two consists of a sync pulse 1' and a color burst 2', followed by luminance information 3' at various levels with chrominance information 4' at various phases of the color subcarrier representing the various colors. FIG. 1C shows the recovered baseband signal produced by the receiver. The waveform in FIG. 1C comprises a narrowed sync pulse 5 followed by R-Y and B-Y chrominance information derived from program one as signified by the subscript 1. R, B and Y are abbreviations for red, blue and luminance, respectively, and the R-Y and B-Y signals are termed the color difference signals. With the NTSC signals synchronized as shown in FIGS. 1A and 1B, the R-Y and B-Y information for a line is sent during the inactive video time. This time includes the horizontal retrace time and overscan time. During the active video portion of the signal, the luminance for program one occurs as baseband information while luminance for program two is encoded as the modulation of a subcarrier 4.5 MHz removed from the main carrier. Following the luminance information for the first line is another narrowed sync pulse 5 followed by compressed R-Y and B-Y chrominance information signals derived from program two as signified by the subscript 2. Again, the luminance information for both programs is encoded during the active video time. It is important to note that the R-Y and B-Y chrominance information for a give line is available before the active video portion of that line. Note also that both luminance signals for program one and for program two are available during each active video line.

Figure 2:
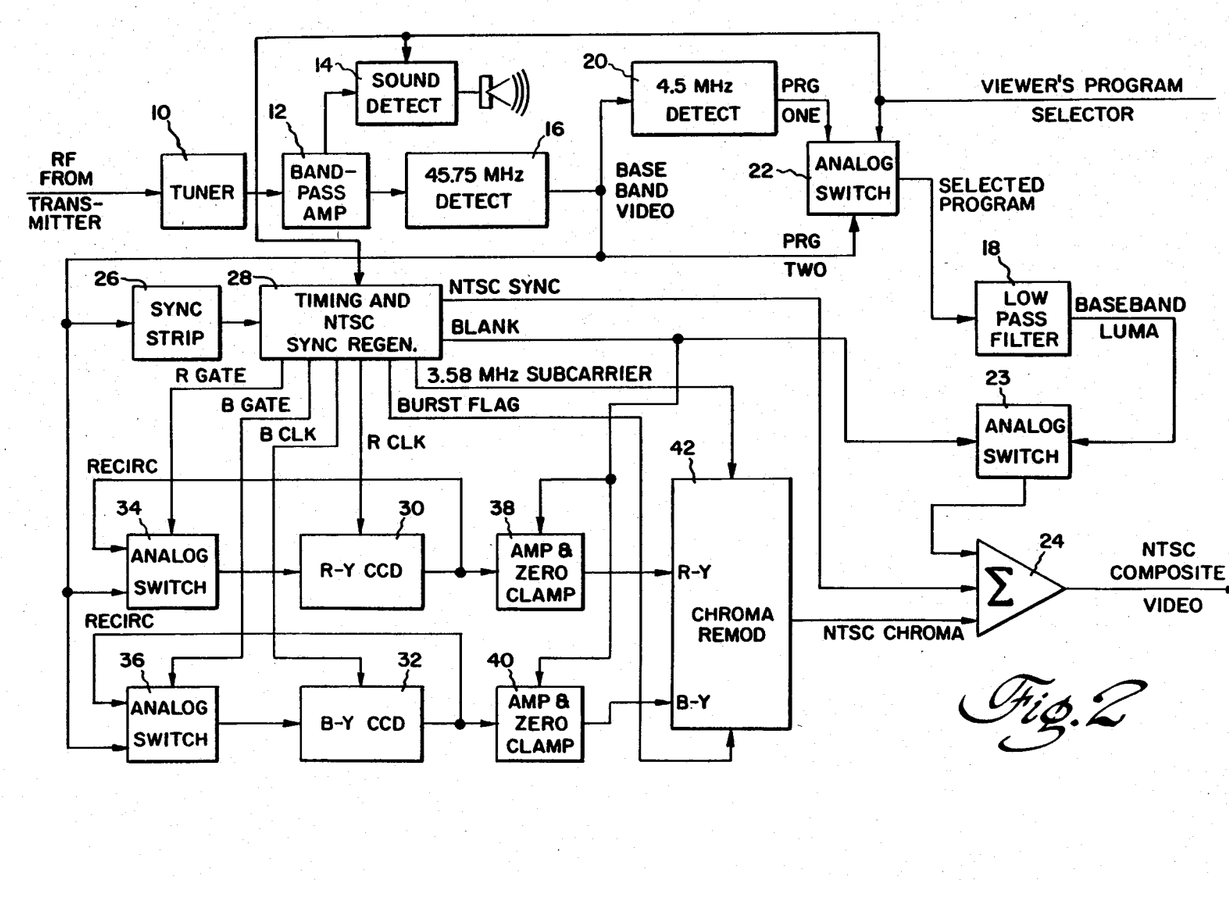
FIG. 2 is a block diagram of a receiver according to the television system described and claimed in the aforementioned copending patent application Ser. No. 06/697,535 and modified according to the present invention.

FIG. 2 shows a block diagram of a receiver useful for reconstructing NTSC composite video signals according to the chrominance time-compressed, luminance bandwidth-reduced television system. Radio frequency (RF) from a cable television system or from an antenna is fed into a tuner 10 which selects the desired channel and provides at its output an intermediate frequency (IF) signal. This IF signal is fed to a bandpass amplifier 12 which rejects unwanted signals adjacent in frequency. Part of the signal is picked off and sent to the sound detector 14 which detects the appropriate sound carrier for the selected channel and demodulates the sound. The bandpass IF video signal is sent to a synchronous detector 16, the output signal of which is baseband video of the form shown in FIG. 1C. Luminance information is extracted by the low pass filter 18. The switch 22 selects either the output signal of synchronous detector 16 of the output signal of synchronous detector 20 for filtering. Synchronous detector 20 detects the baseband video at the 4.5 MHz subcarrier to extract the luminance signal for program two. Thus, the luminance information for program one or program two is extracted depending on the condition of switch 22. In either case, the resulting output signal from the low pass filter 18 is supplied via another analog switch 23 to one input of summing amplifier 24 which provides the NTSC composite video output signal. Filter 18 is the subject of the present invention and will be described in more detail hereinafter.

The sync information is stripped from the baseband video in sync stripper 26 and used to control sync and timing for the rest of the system. Circuit 28 generates timing for the system and also provides the NSC composite sync to an input of summing amplifier 24.

The baseband information is also furnished to two charge coupled delay (CCD) lines 30 and 32 via switches 34 and 36. These delay lines store the B-Y and R-Y information, and when the chrominance information for the desired program is available during horizontal retrace time, switches 34 and 36 are switched to receive the baseband video. High speed clock pulses first load the R-Y CCD 30 and then the B-Y CCD 32. When the active video region is entered, the clock is slowed to one eighth to one twelfth of the high speed value, and switches 34 and 36 are switched to the recirculate positions. As the R-Y and B-Y information is clocked from the CCDs, that same information is recirculated back into the inputs of the CCDs and in so doing, the same chrominance information can be repeated on two adjacent horizontal lines. The output signals of the CCDs 30 and 32 are fed to respective amplifiers 38 and 40 which have their outputs connected to chrominance remodulator 42. The output signal of the remodulator 42 is an NTSC chrominance signal that is supplied to yet another input of the summing amplifier 24, thereby completing the synthesis of the NTSC standard composite video signal which can be sent to an ordinary television set.

Figure 3:
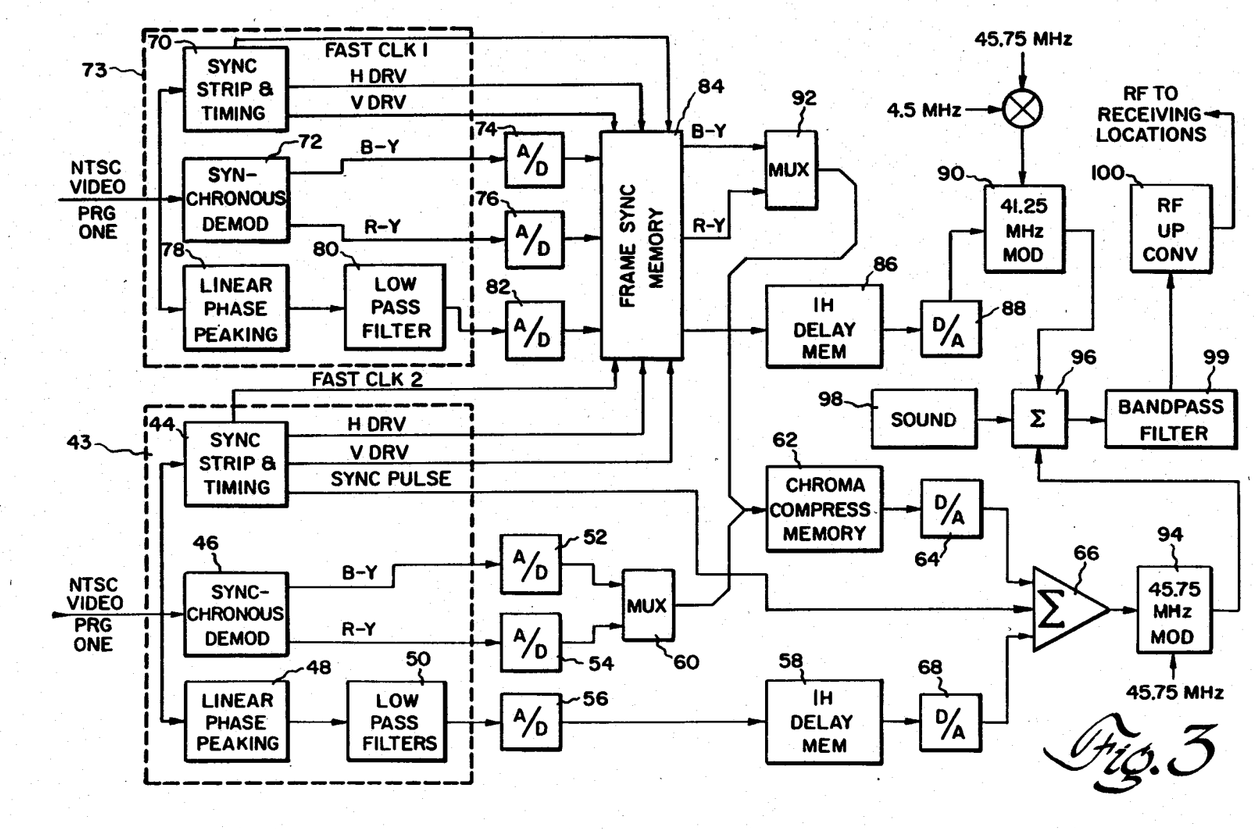
FIG. 3 is a block diagram of a transmitter according to the television system of application Ser. No. 06/697,535 and modified according to the present invention.

FIG. 3 shows a block diagram of the transmitter. Beginning the description in terms of the inputs receiving program two at the video processor circuitry 43, a sync stripping circuit 44 strips the sync signal and identifies the horizontal and vertical intervals in the NTSC standard baseband input signal. The chrominance information is split into the quadrature R-Y and B-Y components using a chrominance demodulator circuit 46. The luminance information is processed by limiting its bandwidth so that it can be accommodated by a predetermined channel bandwidth. A linear phase peaking circuit 48 and low pass filter 50 are used. In the preferred embodiment, the phase peaking circuit comprises a tapped delay line, a differencing amplifier for combining weighted output signals of the tapped delay line, and an edge peaking circuit. The output signal of the edge peaking circuit is equalized and filtered in a filter which is characterized by a slow roll-off response to about 6 dB and then exhibiting a sharp cutoff response. The combination of the phase peaking circuit 48 and the low phase filter 50 enhance the sharpness of the bandwidth compressed pictures. Further details of this optimal filtering and peaking circuit are provided in copending patent application Ser. No. 06/697,600. The low pass filter 50 is also the subject of the present invention and will be described in more detail hereinafter.

The three output signals B-Y, R-Y and filtered luminance are each convereted to digital values by analog-to-digital (A/D) converters 52, 54 and 56, respectively. The luminance data from A/D converter 56 is sent to a memory 58 which provides one horizontal line of delay in order to accommodate the fact that the compressed chrominance cannot be sent until all the chrominance information for a given line has been received. The chrominance from A/D converters 52 and 54 is multiplexed by multiplexer 60 into a chrominance compressed memory 62 which is written during the active video time and read out at a fast rate during the horizontal retrace time, thereby compressing the chrominance information in time. The output signal of the chrominance compression memory 62 is fed to a digital-to-analog (D/A) converter 64 and is subsequently combined in summing amplifier 66 with the output signal of a D/A converter 68 attached to the output of the memory 58. The narrow sync pulse is also combined in summing amplifier 66 with the chrominance and luminance signals.

Program one is handled in essentially the same way. The sync pulse is stripped in sync stripper 70 of video processor circuitry 73 to identify horizontal and vertical intervls. The chrominance signal information is demodulated in demodulator 72 and converted to digital signals in A/D converters 74 and 76, and the luminance signal is appropriately peaked and filtered in linear phase peaking circuit 78 and low pass filter 80 and then converted to a digital siganl in A/D converter 82.

Again, the low pass filter 80 is the subject of this invention and will be described in more detail hereinafter.

At this point in the processing of the signals from the source of program one, the digital signals are entered into a frame synchronizing memory 84 which is used to exactly match horizontal and vertical intervals between program one and program two. This is necessary in order to insure that the horizontal retrace time, during which time the chrominance for program one or program two is sent, and the active video time, during which time luminance information for both programs is sent, are aligned between the two programs.

The luminance from program one is used to amplitude modulate an IF subcarrier whose frequency is 41.25 MHz in IF modulator 90. The subcarrier frequency of 41.25 MHz is 4.5 MHz away from the main IF carrier frequency of 45.75 MHZ. The output of the chrominance information from the frame synchronizer memory 84 is multiplexed to the chrominance compression memory 62 via multiplexer 92. During one line, program one chrominance information is written to the memory 62 during the active video portion, and on the next line, chrominance information from program two is written to the memory 62. Always during the horizontal retrace time, data written to the chrominance compression memory 62 is read from the memory at high speed, converted to an analog signal through D/A converter 64 and combined with the luminance of program two and the narrow sync pulse in summing amplifier 66. The output signal of summing amplifier 66 is used to modulate the main IF carrier frequency of 45.75 MHz in modulator 94. The output signals of modulators 90 and 94 are combined in a hybrid combiner 96 and supplied to a bandpass filter 99 which filters the combined output signals. The sound carriers from sound circuit 98 for the two programs are supplied to a hybrid combiner 97 which combines the output signal of bandpass filter 99 and the audio. The siganl of hybrid combiner 97 is used to drive an RF up converter 100.

Figure 4:
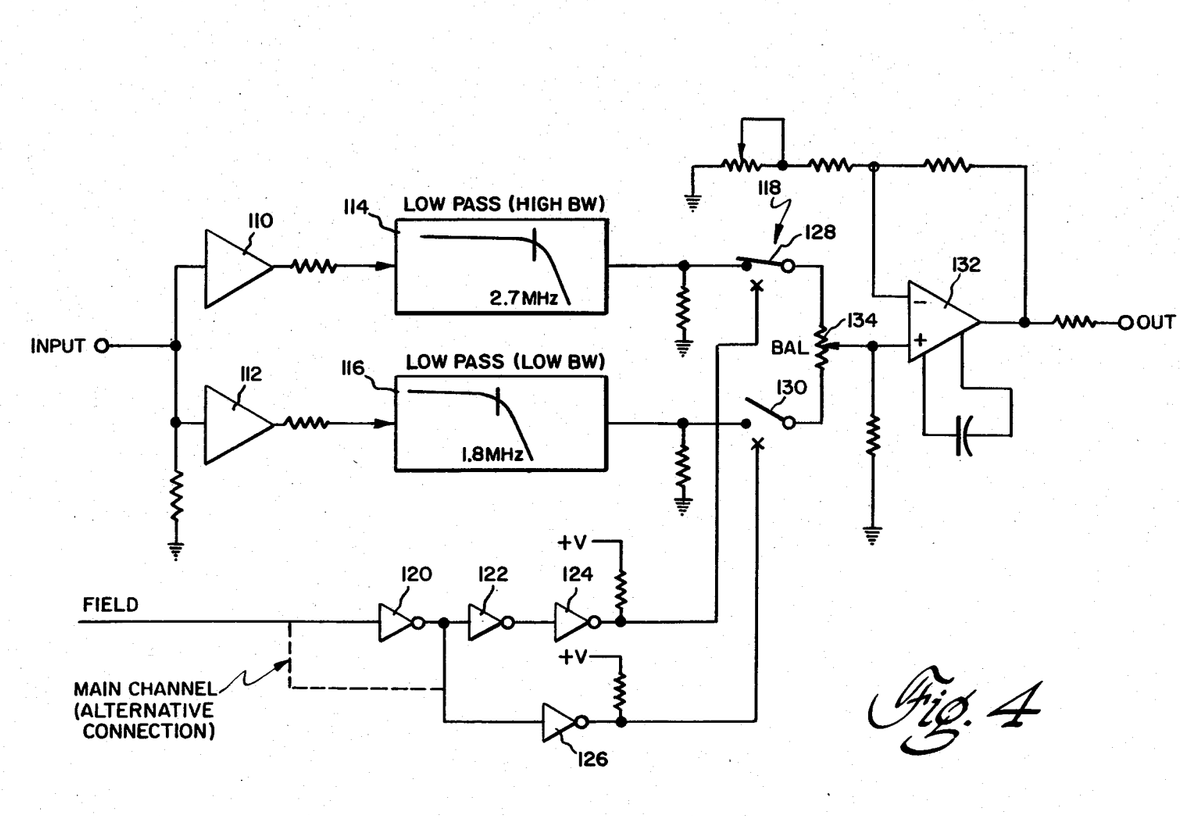
FIG. 4 is a block and schematic diagram of the circuit used in place of the low pass filter in the transmitter of FIG. 3.

As mentioned in the foregoing discussion, the present invnetion relates to a substantial improvement in the low pass filter circuit 18, shown in FIG. 2, and low pass filters 50 and 80, shown in FIG. 3. FIG. 4 shows a block and schematic diagram of the high-low field circuit implemented for use in the transmitter shown in FIG. 3 and is intended to be substituted for each of the low pass filters 50 and 80. The incoming signal to be filterd, carrying luminance information, is buffered by two amplifiers 110 and 112. Amplifier 110 drives a low pass filter 114 whose cutoff frequency is 2.7 MHz. Amplifier 112 drives a low pass filter 116 whose cutoff frequency is 1.8 MHz. The output of each filter is connected to an analog switch 118. The analog switch 118, illustrated functionally, may be implemented with RCA CD4066 CMOS switches anbd is controlled by a field identifier signal which is logic "1" for even fields and logic "0" for odd fields. Inverter circuitry formed by inverters 120, 122, 124 and 126 is used to control the analog switch 118. The switch 118 comprises two CMOS transistor circuits generally indicated by switches 128 and 130, and the inverter circuitry controls these circuits such that one of the two will be on while the other is off. As indicated by the dotted line shorting the input and output of inverter 120, the inverter circuitry is connected differently for the main channel and the slave channel. In this way, the even fields of the master channel will be low pass filtered at 2.7 MHz, while the even fields of the slave channel will be low pass filtered at 1.8 MHz. The odd fields of the master channel will be low pass filtered at 1.8 MHz, and the odd fields of the slave channel will be low pass filtered at 2.7 MHz. The output of analog switch 118 is connected to amplifier 132 through a balance potentiometer 134 such that any differences in the insertion loss of the two filters can be balanced out so that no flicker will appear in the picture.

Referring back to FIG. 3, it will be recalled that the slave channel program one is frame-synchronized before the luminance is modulated into the 41.25 MHz intermediate frequency carrier. Because the two signals (i.e., master and slave or program two and program one, respectively) are frame-synchronized, the even field of each picture and the odd field of each picture will be modulated at exactly the same time. Since the even field of one picture is high bandwidth while the even field of the other is low bandwidth, and vice versa, the 4.5 MHz channel space available for luminance is made to accommodate a high bandwidth and low bandwidth signal at the same time.

Figure 5:
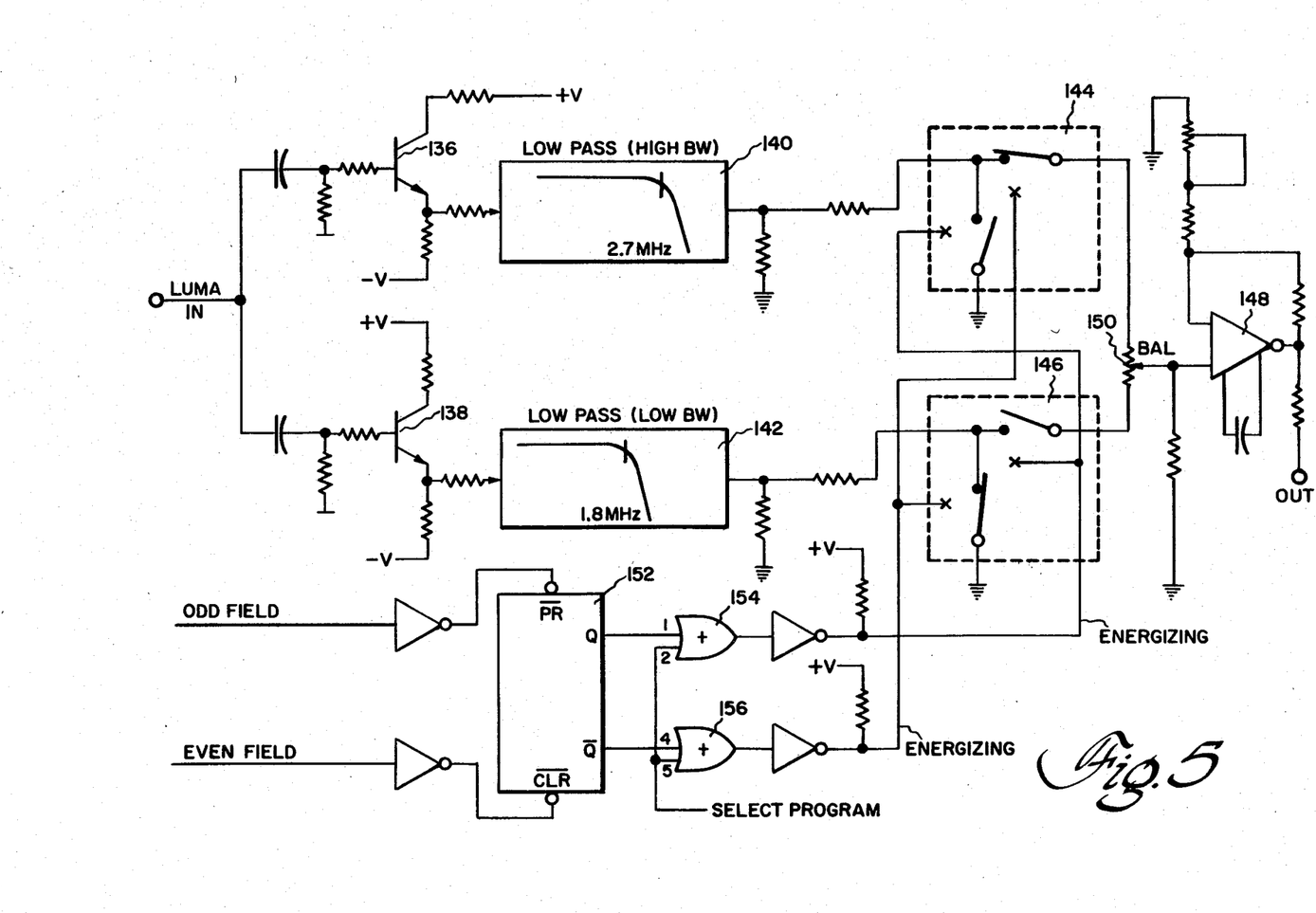
FIG. 5 is a block and schematic diagram of the circuit used in place of the low pass filter in the receiver of FIG. 2.

FIG. 5 shows the detailed schematic of the low pass filter 18 used in the receiver shown in FIG. 2. The incoming luminance signal is applied through transistors 136 and 138 to low pass filter circuit 140 and 142. Transistor 136 connects to low pass filter 140 with a cutoff of 2.7 MHz, while transistor 138 connects to low pass filter 142 with a cutoff of 1.8 MHz. The outputs of these filters are connected to respective analog switches 144 and 146, illustrated functionally. These switches are driven such that if switch 144 is connecting the low pass filter 140 output to amplifier 148, then switch 146 connects its low pass filter output to ground. The reverse situation occurs since, if switch 146 is connecting its low pass filter 142 output to amplifier 148, then switch 144 connects its low pass filter output to ground. As in the transmitter filter circuit, the outputs of the switches 144 and 146 are connected to the input of amplifier 148 through a balancing potentiometer 150.

The drive signals for the switches 144 and 146 are derived from the circuitry which identifies even and odd fields. Flip-flop 152 is configured as a set/reset flip-flop. The odd field sets the flip-flop, while the even field resets the flip-flop. The outputs of the flip-flop 152 are connected to inputs of respective exclusive OR gates 154 and 156. The other input of each of the exclusive OR gates is connected to a select line which is a logic "1" or a logic "0" depending on which program has been selected for viewing. Thus, for example, when program one is selected, the output of exclusive OR gate 154 will be high and the output of exclusive OR gate 156 will be low for odd fields and the opposite for even fields. When program two is selected, the opposite condition will obtained. In this way, the appropriate high bandwidth and low bandwidth filters 140 and 142 can be selected to match the high bandwidth and low bandwidth fields associated with the given program.

It should be noted that while 2.7 MHz and 1.8 MHz have been used as examples, any filter combination which sums to 4.5 MHz can be used. The 2.7/1.8 MHz combination results in the best tradeoff between sharpness and any visible artifacts. The filters themselves can be implemented with either a Gaussian transitional filter exhibiting a slow Gaussian roll-off to 6 dB and then a sharp cutoff or a fifth order elliptical filter again exhibiting a slow roll-off to about 6 dB and then a sharp cutoff. Specific details of the design of these filters may be had by reference to application Ser. No. 06/697,600 filed by Eichelberger, Wojnarowski and Mihran.

While the invention has been described in terms of several preferred embodiments with reference to specific design examples, those skilled in the art will recognize that the examples given may be modified without departing from the scope of the invention.

What we claim is:

1. In a television bandwidth compression system of the type which allows two television programs to simultaneously utilize the bandwidth allowed for one television program, said television bandwidth compression system including a transmitter connected to receive composite video signals from each of first and second program sources, each of said video signals supplying chrominance information, luminance information and synchronization and timing signals, and providing an output signal wherein chrominance information for said first and second program sources is sent on alternate lines of each image frame for each program, respectively, during the normal horizontal retrace time and the luminance information for both program sources is sent during the active video time for each line of each image frame for each program, respectively, and further including a receiver for receiving said output signal from said transmitter and providing an output composite video signal of a selected program from said first or second program sources, the improvement wherein the luminance bandwidths of alternate fields of a television picture are limited to high and low values, said improvement comprising:

in the transmitter, first and second signal processor means responsive, respectively, to said first and second program sources for providing as output signals separated chrominance, luminance and synchronizing signals, each of said first and second video processor means, respectively, including first switched low pass filter means connected to receive said separated lumninance signals and, during alternate fields, passing said separated luminance signals as high and low bandwidth limited luminance signals; and in the receiver, second switched low pass filter means connected to receive said high and low bandwidth limited luminance signals of a selected program in the output signal produced by said transmitter and, during each field, passing a selected one of said high and low bandwidth-limited luminance signals, respectively, in alternate sequence, in synchronism with the selected one of said high and low bandwidth limited luminance signals passed by said first switched low pass filter means.

2. The improvement in the television bandwidth compression system as recited in claim 1 wherein said first switched low pass filter means comprises:

a first low pass filter having a high bandwidth pass characteristic;

a second low pass filter having a low bandwidth pass characteristic; and first switching means connected to supply the output signals of said first and second low pass filters on each field, in alternate sequence, as the output signal of the respective processor means, the first switched low pass filter means in said first processor means providing high bandwidth limited luminance output signals when the first switched low pass filter means in said second processor means does not provide high bandwidth limited luminance output signals and providing low bandwidth limited luminance output signals when the first switched low pass filter means in said second processor means does not provide low bandwidth limited luminance output signals.

3. The improvement in the television bandwidth compression system recited in claim 2 wherein said second switched low pass filter means comprises:

a third low pass filter having a high bandwidth pass characteristic;

a fourth low pass filter having a low bandwidth pass characteristic; and second switching means for alternately supplying a selected one of the output signals of said third and fourth low pass filters as the output signal of the second low pass filter means, said second switching means being synchronized with the first low pass filter means in one of said first and second processor means in said transmitter in accordance with the program selected for viewing.

4. The improvement in the television bandwidth compression system recited in claim 3 wherein each of said low pass filters exhibits a relatively slow roll-off frequency characteristic to about 6 dB and then a relatively sharp cutoff frequency characteristic.

5. The improvement in the television bandwidth compression system recited in claim 4 wherein each of said low pass filters comprises a Gaussian transitional filter having a slow Gaussian roll-off.

6. The improvement in the television bandwidth compression system recited in claim 4 wherein each of said low pass filters comprises a fifth order elliptical filter.

7. The improvement in the television bandwidth compression system recited in claim 4 wherein each of said first and third low pass filters has a bandwidth of approximately 2.7 MHz and each of said second and fourth low pass filters has a bandwidth of approximately 1.8 MHz.

8. A method of compressing the video signals for two television programs into the bandwidth normally allowed for one television program, each said video signal including chrominance, luminance and synchronization and timing signals, said compression method comprising the steps of:

separating the chrominance, luminance and synchronization signals for each said video signal for said first and second programs;

time-compressing the separated chrominance signals for each program;

bandwidth-limiting the separated luminance signals by interlacing high and low bandwidth-limited luminance signals for alternating fields of each program in a manner such that when a high bandwidth-limited luminance signal is transmitted for one program, a low bandwidth-limited luminance signal is transmitted for the other program so that the total bandwidth for the luminance signals is not exceeded; and sending to a receiving site the time-compressed chrominance signals for the first program once during the horizontal retrace time for every alternate line of each image for each program and for the second program once during the horizontal retrace time for each of the remaining lines of each image for each program, respectively, and the luminance signals for both programs during the active video time for each line of each frame for each program, respectively.

9. The method of compressing the video signals for two television programs recited in claim 8 wherein the step of bandwidth-limiting the separated luminance signals by interlacing high and low bandwidth-limited luminance signals for alternating fields is performed by passing said separated luminance signals for each program through respective pairs of switched low pass filters, the filters of each pair having high bandwidth passbands and low bandwidth passbands, respectively.

10. The method of compressing the video signals for two television programs recited in claim 9 wherein said high bandwidth passband is 2.7 MHz and said low bandwidth passband is 1.8 MHz.

11. A television bandwidth compression system which allows two television programs to simultaneously utilize the bandwidth normally allowed for one television program, said television bandwidth compression system comprising:

a transmitter connected to receive a video signal from each of first and second program sources, each said video signal including luminance and synchronization and timing signals, and providing an output signal wherein the luminance information for both program sources is sent during the active video time for each line of each image for each program, respectively, said luminance information being in the form of interlaced high and low bandwidth-limited luminance signals for alternating fields of each program in a manner such that when a high bandwidth-limited luminance signal is transmitted for one program, a low bandwidth-limited luminance signal is transmitted for the other program so that the total bandwidth for the luminance signals is not exceeded; and a receiver connected to receive the output signal from said transmitter and including selecting means for generating a synchronization signal and selecting the luminance information for either one of said first and second program sources, and means for synthesizing a composite video signal from said selected luminance information and said generated synchronization signal.

* * * * *